United States Patent
Berkebile et al.

(10) Patent No.: US 9,983,861 B2
(45) Date of Patent: May 29, 2018

(54) REUSABLE DEPLOYMENT PLANS AND DEPENDENCIES THEREOF

(71) Applicant: INTERNATIONAL BUSINESS MACHINES CORPORATION, Armonk, NY (US)

(72) Inventors: Andrew D. Berkebile, Lakewood, OH (US); Sylvain Carbonell, Rocky River, OH (US); Corrie H. Kwan, Markham (CA); Max L. Warren, Cleveland, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 22 days.

(21) Appl. No.: 15/206,850

(22) Filed: Jul. 11, 2016

(65) Prior Publication Data

US 2018/0011697 A1   Jan. 11, 2018

(51) Int. Cl.
G06F 9/445   (2018.01)

(52) U.S. Cl.
CPC .................... *G06F 8/60* (2013.01)

(58) Field of Classification Search
CPC ........................................... G06F 8/60
USPC ............................... 717/174, 164
See application file for complete search history.

(56) References Cited

U.S. PATENT DOCUMENTS

| 5,630,047 A | 5/1997 | Wang | |
| 6,185,734 B1 * | 2/2001 | Saboff | G06F 8/67 |
| | | | 707/999.202 |
| 7,317,959 B2 * | 1/2008 | Pfander | G06F 9/541 |
| | | | 700/83 |

(Continued)

FOREIGN PATENT DOCUMENTS

WO   2012037818   3/2012

OTHER PUBLICATIONS

"(UrbanCode) Deployment Plan"; IBM Developer website (developer.ibm.com); Feb. 10, 2014.*

(Continued)

*Primary Examiner* — Qing Chen
*Assistant Examiner* — Clint Thatcher
(74) *Attorney, Agent, or Firm* — Nicholas D. Bowman; Matthew M. Hullhan; Heslin Rothenberg Farley & Mesiti PC

(57) ABSTRACT

Reusability of deployment plans and dependencies thereof. A method defines contracts as between multiple deployment plans, the contracts representing dependencies between them; defines wait task(s) in a first set of the deployment plans, a wait task being associated with a contract and completion of the wait task and progression of a deployment plan in which the wait task is defined being dependent on satisfaction of the contract; defines signal task(s) in a second set of the deployment plans, satisfaction of the contract being based on status of signal task(s); selects a collection of deployment plans for concurrent execution, at least one (Continued)

contract of the contracts representing at least one dependency between the collection; and manages the concurrent execution of the collection. Managing controls progression of the execution by enforcing the at least one contract, which enforces the at least one dependency between the collection in the execution of the collection.

20 Claims, 11 Drawing Sheets

(56) References Cited

U.S. PATENT DOCUMENTS

| | | | | |
|---|---|---|---|---|
| 7,765,520 | B2* | 7/2010 | Wagner | G06F 8/20 717/101 |
| 8,745,442 | B1 | 6/2014 | Havemose | |
| 2013/0232497 | A1 | 9/2013 | Jalagam et al. | |
| 2015/0378700 | A1* | 12/2015 | Rachamadugu | G06F 8/60 717/120 |
| 2016/0239280 | A1* | 8/2016 | Scheiner | G06F 8/60 |
| 2017/0255454 | A1* | 9/2017 | Hassine | H04L 41/5045 |

OTHER PUBLICATIONS

Michal Habalcik;"Parallel Programming Part 2: Waiting for Tasks and Exceptions Handling"; C# Corner website (www.c-sharpcorner.com); Jan. 25, 2015.*

"Publish-Subscribe Pattern", Wikipedia, https://en.wikipedia.org/wiki/Publish%E2%80%93subscribe_pattern, last modified Apr. 15, 2016, 5 pages.

"Is there any alternative to MS-Project server to build a collaborative deployment plan?", Wikipedia, http://pm.stackexchange.com/questions/8146/is-there-any-alternative-to-ms-project-server-to-build-a-collaborative-deploymen, edited Nov. 30, 2012, 2 pages.

"Deployment Plan", Wikipedia, https://en.wikipedia.org/w/index.php?title=Deployment_plan&printable=yes, last modified Mar. 11, 2016, 2 pages.

"Create task dependencies (links) within your project", https://support.office.com/en-us/article/Create-task-dependencies-links-within-your-project-71fa4768-bf0d-414a-96e7-4e5d90df9676, 5 pages.

"Create task dependencies (links) across projects", https://support.office.com/en-us/article/Create-task-dependencies-links-across-projects-c635f0eb-43e8-4a4c-a27b-0ff1fe516e9d, 3 pages.

"Application Relese Automation", Wikipedia, https://en.wikipedia.org/wiki/Application_release_automation, 2 pages.

"What's New in UrbanCode Release 6.2.0.0", IBM developerWorks, https://developer.ibm.com/urbancode/products/urbancode-release/whats-new/whats-new-in-urbancode-release-6-2-0-0/, 5 pages.

"What's New—UrbanCode", IBM developerWorks, https://developer.ibm.com/urbancode/products/urbancode-release/whats-new/, 5 pages.

Grace Period Disclosure under 35 U.S.C. Section 102(b)(1): "What's New in UrbanCode Release 6.1.2.2", IBM developerWorks, https://developer.ibm.com/urbancode/products/urbancode-release/whats-new/whats-new-in-urbancode-release-6-1-2-2/, Nov. 2015, 4 pages.

Grace Period Disclosure under 35 U.S.C. Section 102(b)(1): "Managing signal and wait tasks", IBM Knowledge Center, http://www.ibm.com/support/knowledgecenter/SS4GCC_6.2.1/com.ibm.urelease.doc/topics/deployment_tasks_signal_wait.html, Apr. 2016, 2 pages.

* cited by examiner

REUSABLE DEPLOYMENT PLANS AND DEPENDENCIES THEREOF

STATEMENT REGARDING PRIOR DISCLOSURES BY THE INVENTOR OR A JOINT INVENTOR

The following disclosure(s) are submitted under 35 U.S.C. 102(b)(1)(A):

"What's New in UrbanCode Release 6.1.2.2", IBM developerWorks, https://developer.ibm.com/urbancode/products/urbancode-release/whats-new/whats-new-in-urbancode-release-6-1-2-2/, November 2015, 4 pages.

"Managing signal and wait tasks", IBM Knowledge Center, http://www.ibm.com/support/knowledgecenter/SS4GCC_6.2.1/com.ibm.urelease.doc/topics/deployment_tasks_signal_wait.html, April 2016, 2 pages.

BACKGROUND

Many organizations implement changes or updates to resources by executing deployment plans that include of sequences of tasks. Independent business units of the organization typically execute their own deployment plans tailored to their particular business and processes. Deployment plans may vary in terms of their constituent tasks—some tasks being common to several deployment plans and some tasks being unique to a given deployment plan. It may be difficult for the independent business units executing their own deployment plan(s) to adequately enforce dependencies on deployment plans that other business units are executing. Direct dependencies between tasks of different deployment plans can prevent easy reuse of those deployment plans for future deployment events. For instance, the teams, applications, and versions may vary from one deployment event to another.

SUMMARY

Shortcomings of the prior art are overcome and additional advantages are provided through the provision of a computer-implemented method that includes defining one or more contracts as between multiple deployment plans. The one or more contracts represents one or more dependencies between the multiple deployment plans. The method also includes defining one or more wait tasks in a first set of the multiple deployment plans, where a wait task of the one or more wait tasks is associated with a contract of the one or more contracts and where completion of the wait task and progression of a deployment plan in which the wait task is defined is dependent on satisfaction of the contract. The method further includes defining one or more signal tasks in a second set of the multiple deployment plans, where satisfaction of the contract is based on status of at least one signal task. The method selects a collection of deployment plans of the multiple deployment plans for concurrent execution, where at least one contract of the one or more contracts represents at least one dependency, of the one or more dependencies, between the collection of deployment plans, and manages the concurrent execution of the collection of deployment plans, where the managing controls progression of the execution of the collection of deployment plans by enforcing the at least one contract, the enforcing the at least one contract enforcing the at least one dependency between the collection of deployment plans in the execution of the collection of deployment plans.

Further, a computer program product including a computer readable storage medium readable by a processor and storing instructions for execution by the processor is provided for performing a method that includes defining one or more contracts as between multiple deployment plans. The one or more contracts represents one or more dependencies between the multiple deployment plans. The method also includes defining one or more wait tasks in a first set of the multiple deployment plans, where a wait task of the one or more wait tasks is associated with a contract of the one or more contracts and where completion of the wait task and progression of a deployment plan in which the wait task is defined is dependent on satisfaction of the contract. The method further includes defining one or more signal tasks in a second set of the multiple deployment plans, where satisfaction of the contract is based on status of at least one signal task. The method selects a collection of deployment plans of the multiple deployment plans for concurrent execution, where at least one contract of the one or more contracts represents at least one dependency, of the one or more dependencies, between the collection of deployment plans, and manages the concurrent execution of the collection of deployment plans, where the managing controls progression of the execution of the collection of deployment plans by enforcing the at least one contract, the enforcing the at least one contract enforcing the at least one dependency between the collection of deployment plans in the execution of the collection of deployment plans.

Yet further, a computer system is provided that includes a memory and a processor in communications with the memory, wherein the computer system is configured to perform a method including defining one or more contracts as between multiple deployment plans. The one or more contracts represents one or more dependencies between the multiple deployment plans. The method also includes defining one or more wait tasks in a first set of the multiple deployment plans, where a wait task of the one or more wait tasks is associated with a contract of the one or more contracts and where completion of the wait task and progression of a deployment plan in which the wait task is defined is dependent on satisfaction of the contract. The method further includes defining one or more signal tasks in a second set of the multiple deployment plans, where satisfaction of the contract is based on status of at least one signal task. The method selects a collection of deployment plans of the multiple deployment plans for concurrent execution, where at least one contract of the one or more contracts represents at least one dependency, of the one or more dependencies, between the collection of deployment plans, and manages the concurrent execution of the collection of deployment plans, where the managing controls progression of the execution of the collection of deployment plans by enforcing the at least one contract, the enforcing the at least one contract enforcing the at least one dependency between the collection of deployment plans in the execution of the collection of deployment plans.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are facilities providing efficient concurrent execution of deployment plans while enforcing the dependencies between them regardless of variances that may occur in reusing those deployment plans in different deployment events. A deployment plan includes a sequence of tasks, manually and/or automatically performed, that are executed to implement one or more changes to a target. The target may be a system environment or the like. One example application of deployment plans is in application release automation (ARA) in which an application or update is deployed and put into production. This process must generally be very sensitive to the order in which the steps of the deployment plans are executed. Even though deployment plan tasks may be carried out manually, automatically (by a computer), or a combination of the both, the flow of execution and control thereof is managed by computer system(s).

Figure 1:
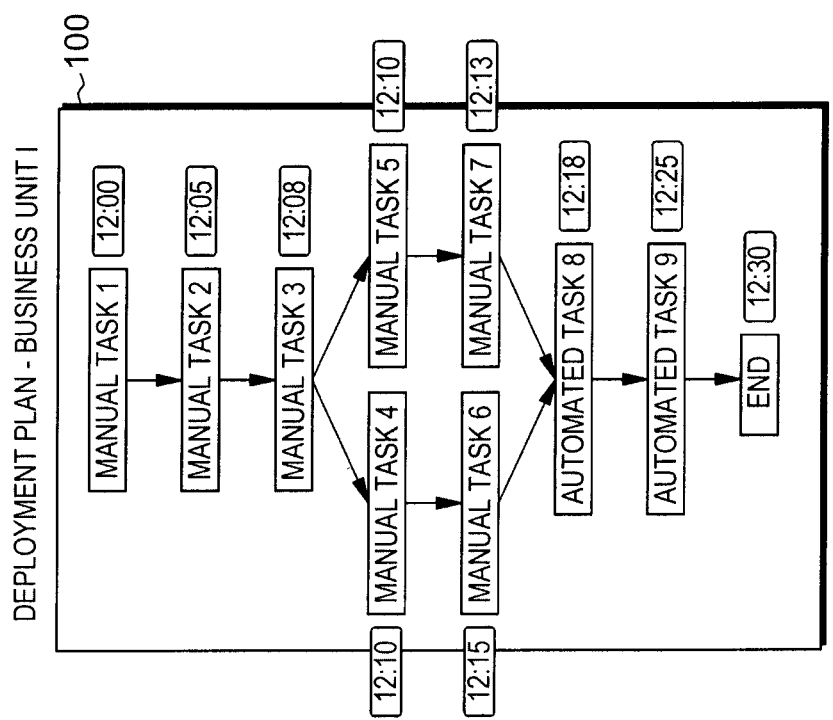
FIG. 1 depicts an example deployment plan for a business unit.

FIG. 1 depicts an example deployment plan 100 for Business Unit 1. The plan depicts several tasks and their respective estimated start times. The flow progress with manual tasks 1, 2, 3 performed sequentially, followed by two groups of tasks (4+6 and 5+7) that are concurrently performed, followed by two automated tasks 8 and 9. Execution of the deployment plan refers to performance of the plan's tasks (both manual and automated) and the coordination involved. As noted, a server or other computer system typically manages execution of these deployment plans, including initiating commencement of the tasks and tracking progress of the plans, estimated start/end times and actual start times. For some tasks, the server will automatically start and execute the task. Users will be at least partially responsible for executing some task(s) outside of the server and manually marking the tasks as started/complete. In any case, the server tracks the progress of the plan, potentially relying on some manual input.

A single plan may apply to one application or several applications. Commonly, each task in a deployment plan applies a particular different application. As is seen from FIG. 1, a deployment plan may include both sequential and parallel execution of tasks. Among tasks in a deployment plan, there are dependencies in that one task (say task 8) may need to complete in order for another task (task 9) to begin. Task 8 is multiply dependent on tasks 6 and 7 in this example.

A deployment plan typically encapsulates execution of deployment for a well-defined business unit and its set of applications, and a deployment event is a collection of deployment plans to execute as part of an overall deployment. For instance, a banking organization may include several different technical teams supporting individual bank services (mortgage, savings accounts, credit cards, website, etc.). The different units will usually deploy their own applications for their own purposes largely without regard to the deployment by other business units except that there may be inter-plan dependencies that everyone, or at least several plans, should be aware of. As a specific example, the deployment plans for two different business units may each have a task that is dependent on restart of a particular server, which restart task is performed in a third deployment plan for the IT business unit.

Though deployment plans are usually restricted to a single business unit, any number of business units in an enterprise deployment could have on-going deployments that could be impacting each other. However, existing technologies fail to provide a mechanism that enforces dependencies between tasks among multiple concurrent deployments that are reusable without extra configuration as between the multiple concurrent deployments, and that conforms to the set of business units participating and the set of applications being deployed. Aspects described herein enable reusability in that once the deployment plans are setup as described herein, no additional configuration is necessary each time a given deployment plan is reused.

Figure 2A:
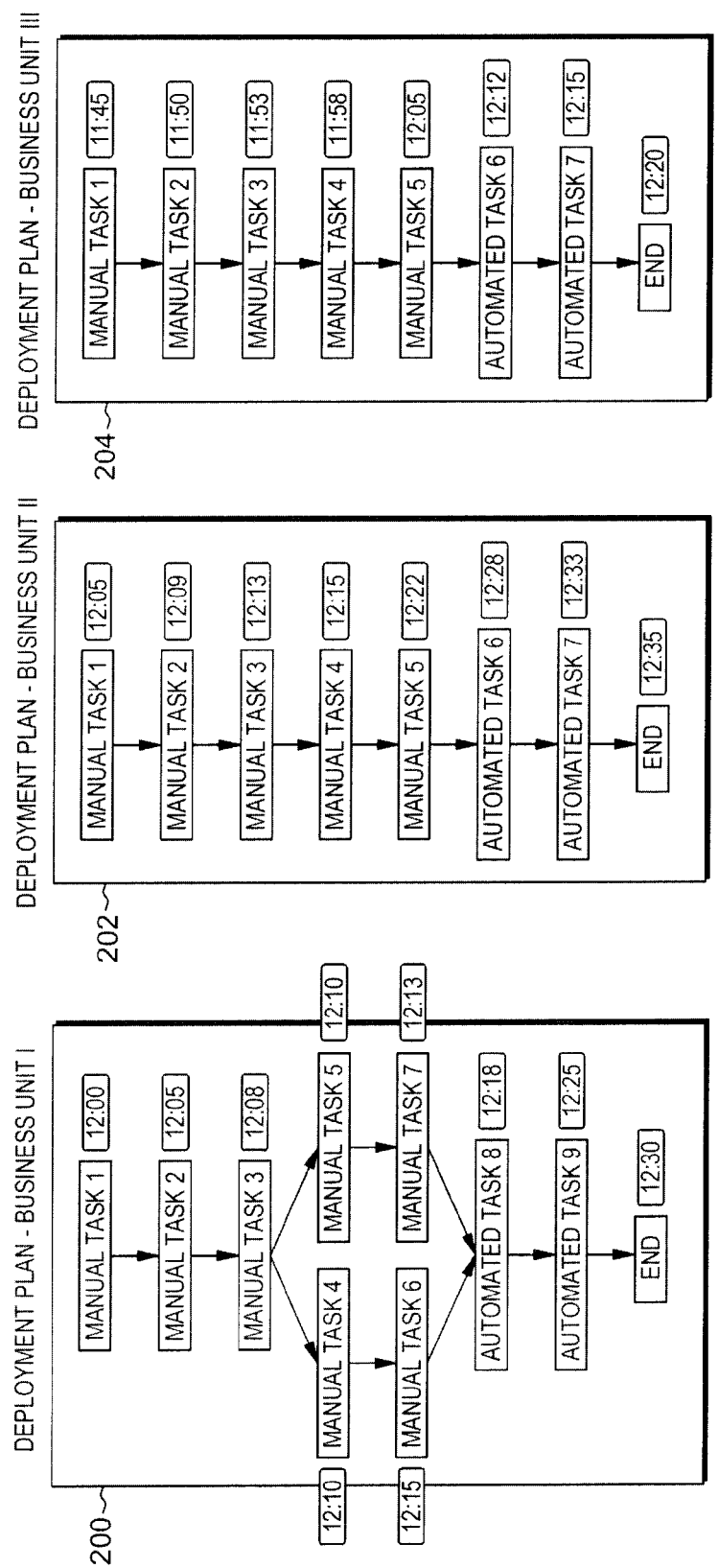
FIG. 2A depicts an example of multiple deployment plans.

FIG. 2A depicts an example of multiple deployment plans. In FIG. 2, deployment plans 200, 202, and 204 are for business units 1, 2, and 3, respectively. Task numbering in the different deployment plans does not imply a correlation; manual task 1 of plan 200 is not necessarily the same as manual task 1 of plan 202 for example. However, it is noted that two or more deployment plans may include a common task, for instance manual task 2 of deployment plan 200 may be the same task as manual task 1 of deployment plan 202. Estimated start time for each task is also noted in FIG. 1.

Figure 2B:
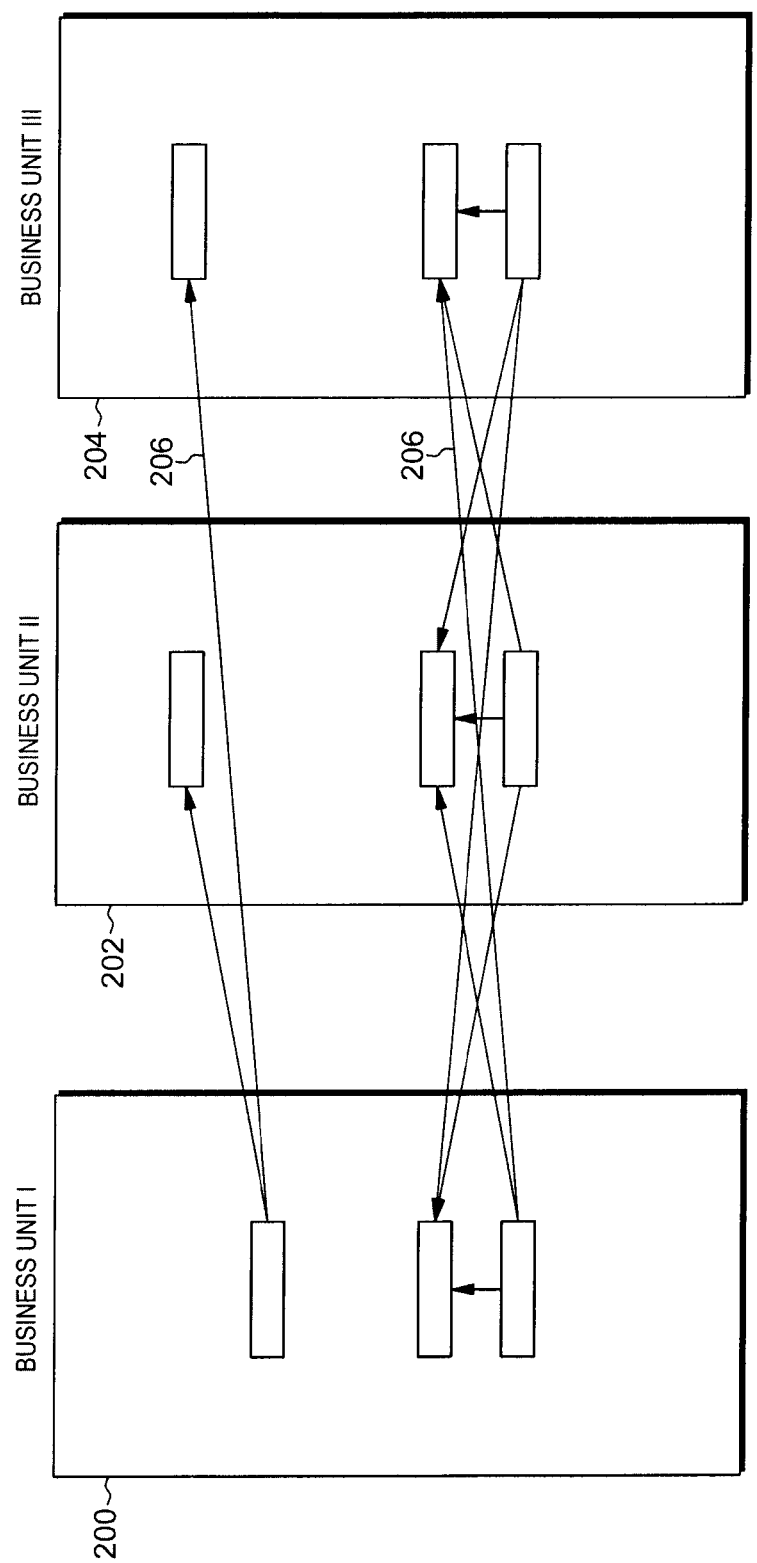
FIG. 2B depicts dependencies between tasks of the multiple deployment plans of FIG. 2A.

Dependencies may exist between tasks of the different plans. FIG. 2B depicts these dependencies between tasks of the multiple deployment plans of FIG. 2A. Shown in FIG. 2B are the direct explicit links 206, representing the dependencies across the plans 202, 204 and 206, with the details as to which individual tasks are involved being omitted. The Figure illustrates how convoluted the dependency linking can become in even a very simple example like the one shown. The lowermost task of plan 202 is shows with dependence on a respective task from each of the three plans, meaning three separate links 206 are needed to represent that dependency.

Dependency tracking using project management software of the like may follow the approach of directly linking the deployments, as depicted in FIG. 2B. However, this approach for several reasons does not lend itself to reuse. Additional configuration would be needed to accommodate new deployment plans, especially in the 'many-to-many' dependent linking case. If a plan is reused and versioned, the dependencies would need to be scoped among the several executions of the plan, requiring manual specification of which execution towards which a given dependency points.

Each business unit's plan may be deploying a different set of applications, so the structure of that unit's plan could change between deployments. Accessing and editing other teams' plans would be challenging and tedious. Consequently, direct links as in the example of FIG. 2B may necessitate extensive configuration considering the permutations of participating business units, applications, versions of plans, and the overall selection of relevant deployment plan executions (instances). Thus, this approach may lack reusability and flexibility of the plans across deployment events without extensive configuration.

In accordance with aspects described herein, dependent tasks subscribe to a well-known contract and the tasks that are depended-upon publish to that well-known contract. This provides greater flexibility and reusability. A 'contract' is a well-known (as between deployment plans) agreed-upon entity representing the one or more dependencies between two or more deployment plans, i.e. between tasks of those plans. The contract acts as a locking mechanism for tasks that depend on satisfaction of the contract in order to proceed. A contract is also referred herein as a 'checkpoint'.

As described herein, a plan may have no direct knowledge of related plans, but may be linked to well-known contract(s) in order to adhere to dependencies. A new deployment plan can impact the existing plans simply by publishing to a well-known contract used by those existing plans, i.e. because their progress will be dependent on the new plan publishing to the contract. This can greatly simplify the most complex dependency situations, for instance where many plans depend on many other plans.

Under this approach, there is no need to access a plan owned by another team in order to ensure adherence to the dependencies. Instead, the necessary plans will publish to checkpoints at the appropriate times, and plans will subscribe to and wait on satisfaction of those checkpoints in order to continue executing.

A grouping mechanism is used to scope the impact of the contracts involved in a particular deployment event. If there are three participating deployment plans in a deployment event, then only those plans will listen to and satisfy a given checkpoint. Management of the execution of the deployment event will recognize not to wait on a signal from any other plan that would otherwise (if participating in the deployment event) publish to the checkpoint. The deployment plans become templated, reusable, and flexible, adjusting to participating applications and contents.

A publish-subscribe pattern with respect to actionable items in deployment plans is leveraged that adds two new task types to deployment plans. Signal (publish) tasks and wait (subscribe) tasks satisfy and depend, respectively, on a checkpoint (topic). This enables the enforcement of cross-deployment dependencies in a general way that is decoupled regardless of the cardinality of the dependencies, the participating applications, or the business units involved. This also allows for easy reuse of the deployment plans in future deployment events.

A task within a deployment plan run by an independent business unit can subscribe to a checkpoint that is satisfied by the completion of one or many tasks in other deployment plans, typically run by other business unit(s). A task that subscribes to a checkpoint cannot be completed until the task(s) that publish to the checkpoint are completed. This is a way of enforcing dependencies across deployment plans and across teams (business units) in a way that is reusable for future deployment events and flexible with regard to who may or may not be participating.

The management of the concurrent execution of the deployment plans, including coordination of the checkpoint and therefore enforcement of the dependencies, may occur within a computer system running a release automation program. One example of a release automation program is the IBM UrbanCode Release management tool offered by International Business Machines Corporation, Armonk, N.Y., U.S.A. (of which URBANCODE is a trademark). The deployment plans can be run in the same system and/or one or more other computers systems, in any case with their states being monitored and enforced by the release automation server, as one example. Each of the involved deployment plans may have an associated state stored in, e.g., a relational database. The release server generally enforces dependencies and does not allow manipulation of the plan states in illegal ways. When a wait task (described below) in a deployment plans starts, the system can run a query to check whether all signals that are tied to that checkpoint and in a participating deployment plan are completed. If not, execution of the deployment plan with the waiting wait task continues waiting. Whenever a signal completes for a checkpoint, the system can query whether that was the last signal. If so, then any wait task that was waiting on the checkpoint is released, and the flow of the deployment plan(s) waiting on the checkpoint may proceed. The server can enforce the correctness of these states, and that includes monitoring checkpoint completion and controlling progression of the plans accordingly.

Accordingly, signal and/or wait task(s) can be added into a deployment plan along with, and in the same manner as, manual and automated tasks. The addition of such wait and signal tasks may be manual and/or automatic. There may be user or machine-provided input specifying the checkpoint (topic) on which the signal (signal task) will satisfy or the wait task will depend. In the execution of the plan, these tasks can automatically start when opened in the plan. Signal tasks can complete immediately, i.e. deliver their signal to the managing entity to signal completion, and wait tasks can complete when all signal tasks for the corresponding checkpoint are completed.

As used herein, a checkpoint is a well-known contract indicating synchronization point(s) across one or more business units within an enterprise deployment. A signal (or signal task) is a task that publishes or satisfies a checkpoint once the signal task is completed. In this regard, as soon as a signal task can be started it may automatically finish and satisfy its portion of the checkpoint. A wait (or a wait task) is a task that subscribes to a checkpoint and cannot be started until all signals that publish to that checkpoint have completed. A deployment even is a well-known enterprise deployment effort that contains several deployment plans run by multiple business units. Each event has its own set of checkpoints upon which signals and waits within the event act.

An overview of aspects described herein is as follows: The checkpoints/contracts as between multiple deployment plans are defined. These represent globally significant tasks representing the dependencies between the multiple deployment plans. Next, wait tasks are defined in the appropriate deployment plans of the multiple deployment plans. The particular plans in which the wait tasks are defined will include any plan for which its execution at any point is dependent on satisfaction of a contract. It is noted that, typically, several or all of the multiple plans will include at least one wait task, though there may be situations where an involved deployment plan has no waits. The set of deployment plans, of the multiple deployment plans, in which respective wait task(s) are defined may include one, many, or all of the multiple deployment plans.

Signal tasks are also defined in the appropriate deployment plans of the multiple deployment plans. The particular plans in which the signal tasks are defined will include any plan that contributes to the satisfaction of a contract, i.e. any plan that serves are a dependency to another plan's execution. It is noted that, typically, several or all of the multiple plans will include at least one signal task, though there may be situations where an involved deployment plan has no signals but waits on one or more checkpoints. The set of deployment plans, of the multiple deployment plans, in which respective signal task(s) are defined may include one, many, or all of the multiple deployment plans.

At some point after the waits and signals are defined in the multiple deployment plans, a process groups executions of plans that could affect the operations of other plans—multiple business units deploying within the same enterprise deployment event, which can be executed. The waits and signals are monitored to enforce the dependencies between the plans of the deployment event. Deployment plans may be considered templates, enabling creation of future executions of these plans (in other deployment events) in different combinations while preserving the ability to easily enforce dependencies between them. In some examples, a managing server (perhaps responsive to user input) creates the deployment plans including tasks involved, and the deployment events, and enforces the proper execution of the events, including enforcement of the checkpoints. The managing server can also provide quality checks, for instance detecting and preventing circular dependencies. The managing server can additionally provide timing updates to the different deployment plans, in part based on its global view of the event and the status of the signaling and completion of the checkpoints. As noted herein, the managing server may be distinct from computer system(s) actually concurrently executing the deployment plans.

Further details of the above overview process are now provided. Initially, the contracts or checkpoints are defined in multiple deployment plans. Typically these are defined initially by an enterprise release management organization (e.g. a unit) in the bigger organization and then programmatically on the managing server. The contracts represent dependencies between deployment plans—potentially halting actions that one business unit could take that could impede another unit's progress, or that the other unit otherwise should know about. Part of this definition of the checkpoints includes identifying the potential synchronization points or blocking actions that could influence another unit. They could be actions that have a more global scope like restarting a server and informing several other units about that restart, or could be used specifically to communicate with from one team (unit) to another.

An example checkpoint is: "Systems rebooted", where one or more units would include a signal task that provides an indication that that 'systems rebooted' for that unit have completed. One or more other units would include wait task(s) waiting for the checkpoint to become satisfied, i.e. an indication that "Systems rebooted" has completed for the necessary plans. "Network rerouted to outage notice" and "All artifacts deployed" are other examples of checkpoints. Various other types of checkpoints are also possible.

Figure 3:
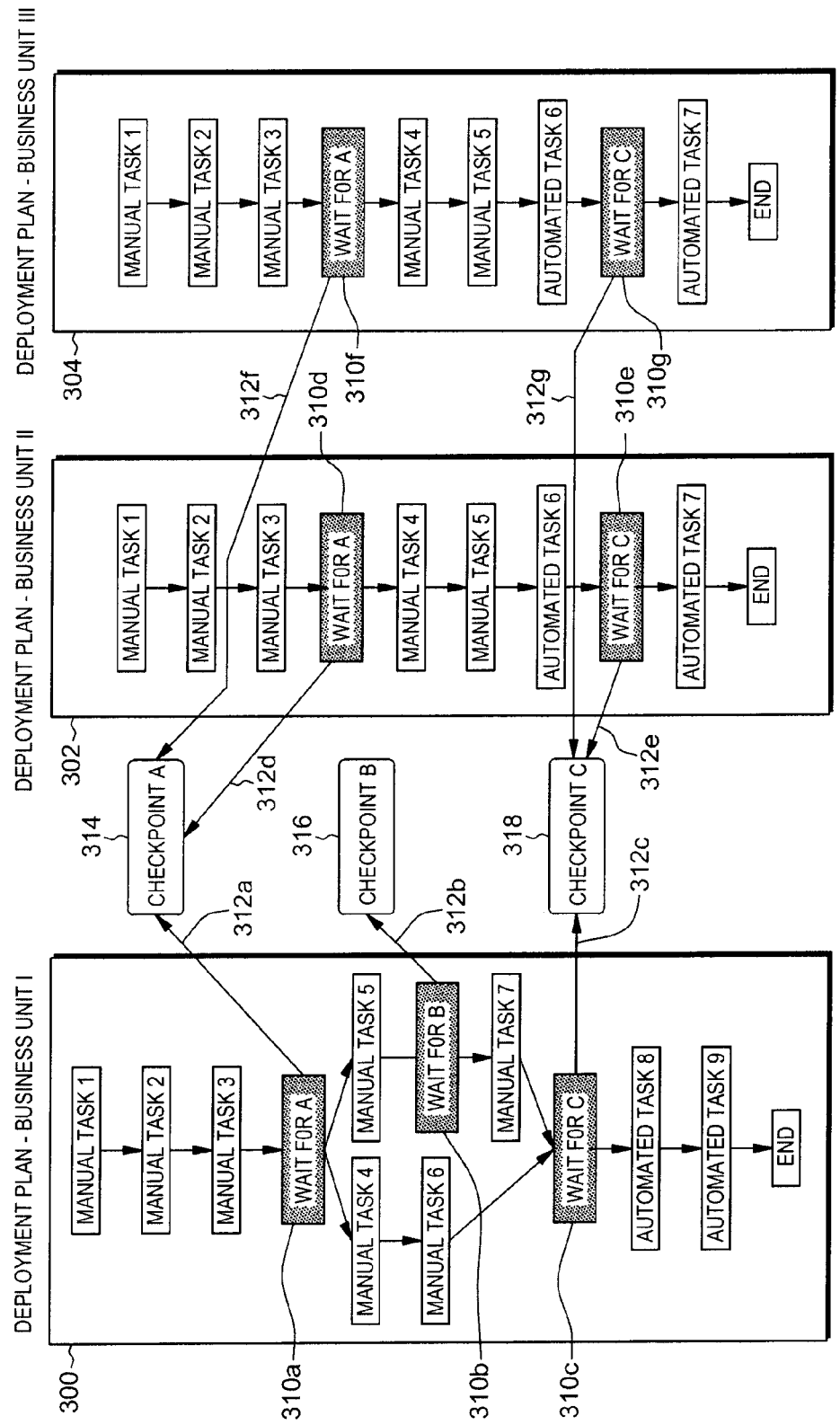
FIG. 3 depicts an example in which wait tasks are defined in a first set of the multiple deployment plans of FIG. 2A, in accordance with aspects described herein.

The process continues by defining wait tasks in the multiple plans. FIG. 3 depicts an example in which wait tasks are defined in a first set of the multiple deployment plans of FIG. 2A, in accordance with aspects described herein. In FIG. 3, each of the deployment plans 300, 302, and 304 include at least one defined wait task.

In FIG. 3, three checkpoints: checkpoint A (314), checkpoint B (316), and checkpoint C (318) are defined for the multiple deployment plans 300, 302, 304. Coincidentally, each of these three deployment plans includes at least one wait task. For checkpoint A 314, wait task 310a of plan 300, wait task 310d of plan 302, and wait task 310f of plan 304 are all defined. Consequently, plan 300 will wait on checkpoint A 314 until it is satisfied, to then proceed to concurrent manual tasks 4 and 5. Plan 302 will wait between its manual tasks 3 and 4, and plan 304 will wait between its manual tasks 3 and 4. Plan 300 also includes wait task 310b, which is the only wait task waiting on completion of checkpoint B 316. Finally, checkpoint C 318 has three wait tasks: 310c of plan 300, 310e of plan 302, and 310g of plan 304, waiting on checkpoint C's completion. An arrow 312a-312g indicates the dependence that a given wait task has on a checkpoint.

Figure 4:
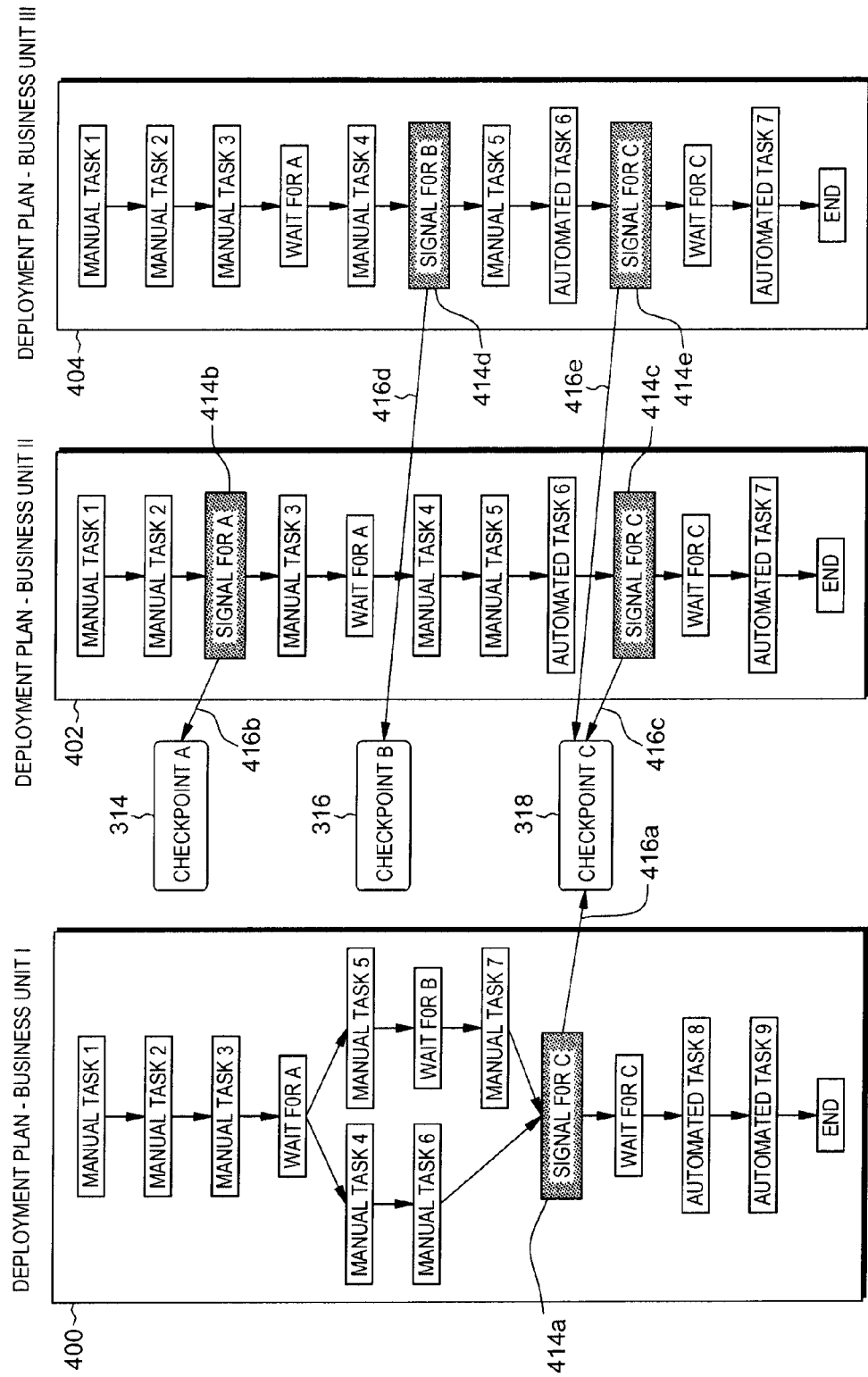
FIG. 4 depicts an example in which signal tasks are defined in a second set of the multiple deployment plans of FIG. 2A, in accordance with aspects described herein.

Signal tasks are defined in addition to wait tasks. The signal tasks are typically defined initially by the enterprise release management organization (e.g. a unit) in the bigger organization and then on the managing server in the deployment plan. FIG. 4 depicts an example in which signal tasks are defined in a second set of the multiple deployment plans of FIG. 2A, in accordance with aspects described herein. In this example, the second set of deployment plans includes all three of the deployment plans of FIG. 2A. The wait tasks defined as shown in FIG. 3 are also shown in FIG. 4. It should be noted that wait tasks and signal tasks can be defined at any time in any desired order.

An arrow 416a-416e in FIG. 4 indicates which signal task(s) signal a connected checkpoint. As shown in FIG. 4, deployment plan 400 has signal task 414a defined therein, which is one of three signals for checkpoint C 318 (signal tasks 414c of plan 402 and 414e of plan 404 are the other signals for checkpoint C). Signal task 414b of plan 402 signals checkpoint A 413, and signal task 414d of plan 404 is the only signal for checkpoint B 316 in this example.

A signal need not necessarily be a separate task; it could be part of another task for example. Additionally or alternatively, a signal task could perform other actions in addition to signaling a checkpoint.

It is noted that a signal 414b for checkpoint A is executed in plan 402 and plan 402 subsequently (two tasks later) waits for checkpoint A to complete even though in this example checkpoint A will necessarily already be satisfied on account that 414b is the only signal to it. This wait task in plan 402 is nonetheless retained in the plan even though under this collection of deployment plans checkpoint A will always be satisfied by the time the wait task is encountered. Retention off this wait task provides flexibility and reusability because other plans that also signal checkpoint A may be added, i.e. to form a new deployment event. By retaining the wait task for A in deployment plan 402, no re-configuration of plan 402 is needed to add-back that wait to plan 402 if subsequently some additional plan is to signal checkpoint A for completion.

Aspects described herein provide an elegant solution for handling dependencies among several deployment plans, as is illustrated through the relative simplicity of the dependencies between FIGS. 3 and 4. This is the case even when different cardinalities are involved. Cardinality correlates to the complexity of the dependencies between tasks. If one task depends on one task, the cardinality is 1:1. If commencement of one task depends on completion of five tasks (or a variable number of tasks), then the cardinality is 1:n.

A cardinality of n:m denotes a set of several tasks that all depend on another set of several tasks. In an approach involving direct dependencies (see FIG. 2B), an exponentially higher number of mappings are created, and are not necessarily reusable (i.e. the mappings will need to be modified depending on the plans involved). In contrast, according to the wait/signal approach described herein, a business unit can have zero or one signal for any given checkpoint and zero or one wait for any given checkpoint, and there are no explicit mappings between plans. Moreover, reusability of the plans is made easy. When a plan is added for execution, each signal task in the plan is to be considered when determining whether the involved checkpoint is satisfied, and each wait task in the plan is to receive an indication that the involved checkpoint is satisfied.

After the wait tasks and signal tasks are defined in multiple deployment plans, deployment events can be created using one or more of those multiple deployment plans. The deployment event is then executed to run the deployment.

Figure 5:
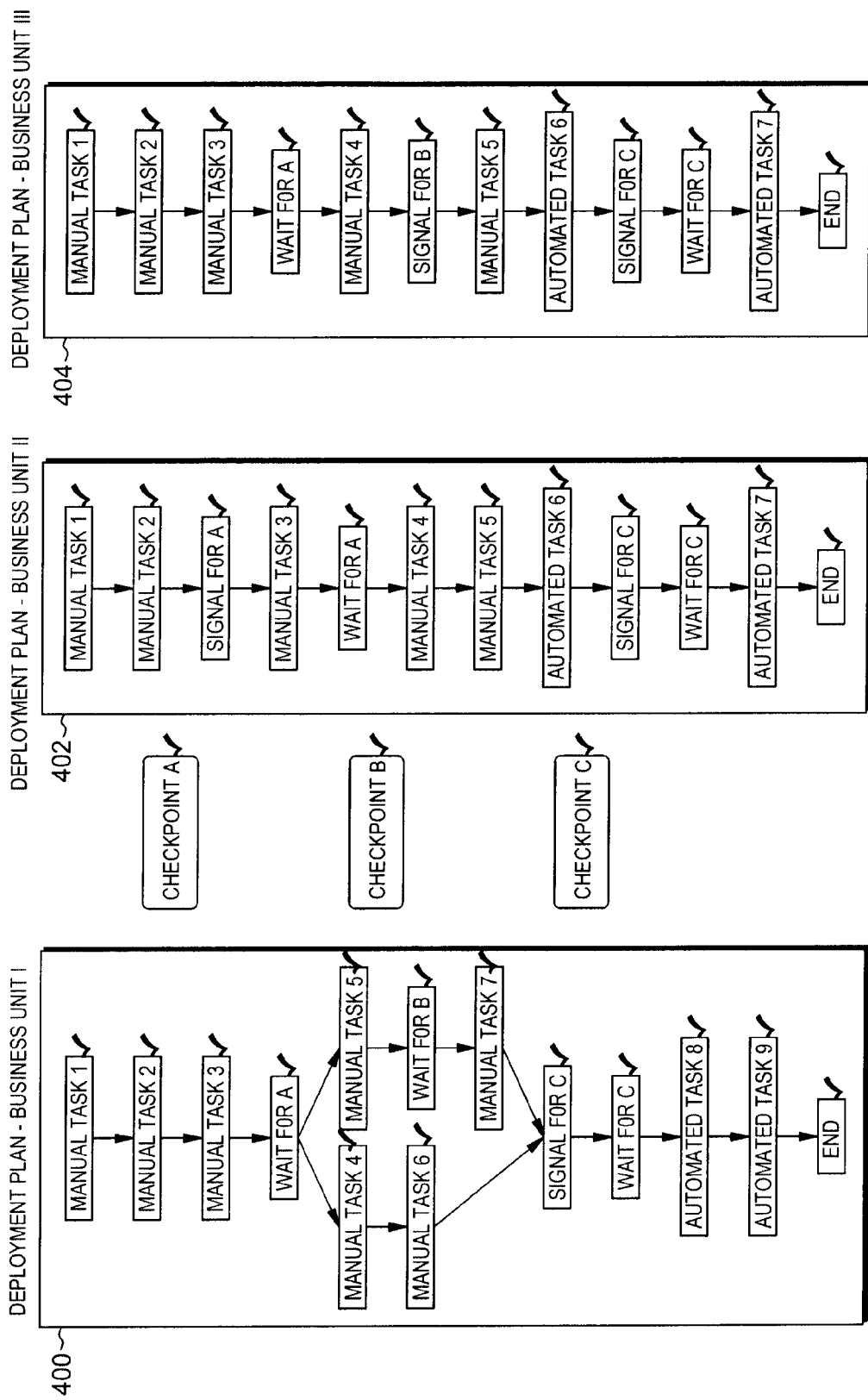
FIG. 5 depicts completion statuses of tasks after concurrent execution of a first deployment event including a first collection of the multiple deployment plans, in accordance with aspects described herein.

Depicted in FIG. 5 is a collection of the multiple deployment plans, forming a deployment event. In this case, the collection includes each of the multiple deployment plans of FIG. 4, i.e. plans 400, 402 and 404. Execution of the deployment event includes concurrent execution of the deployment plans (i.e. the tasks therein) of the deployment event. Concurrent execution in this context means there is some overlap in runtime of the plans. Checkmarks in FIG. 5 indicate completion of the object. FIG. 5 depicts completion statuses of tasks after concurrent execution of a first deployment event including a first collection (i.e. all) of the multiple deployment plans, in accordance with aspects described herein. In this example, as is seen from FIGS. 3, 4, and 5:

Plan 402 signals checkpoint A after completing manual task 2 of plan 402, and both plan 400 and plan 404 wait (after completing their respect manual tasks 3) for an indication of checkpoint A completion;

Plan 402 includes a wait for checkpoint A but practically speaking there will be minimal or no wait in this example because checkpoint A will already have been satisfied by plan 402's signal for checkpoint A (and checkpoint A has no other signals in this deployment event);

Checkpoint B is satisfied based on a single signal for B from plan 404 after manual task 4 of plan 404, and plan 400 waits for checkpoint B's completion after completing manual task 5;

Plan 400 signals checkpoint C after completion of both manual task 7 and manual task 6, plan 402 signals checkpoint C after completing automated task 6, and plan 404 signals checkpoint C after completing automated task 6. Additionally, each plan waits for checkpoint C after signaling it. With the configuration of the signals for checkpoint C followed by a wait for checkpoint C in each plan, checkpoint C serves as a synchronization point across all plans involved in this event.

Figure 6:
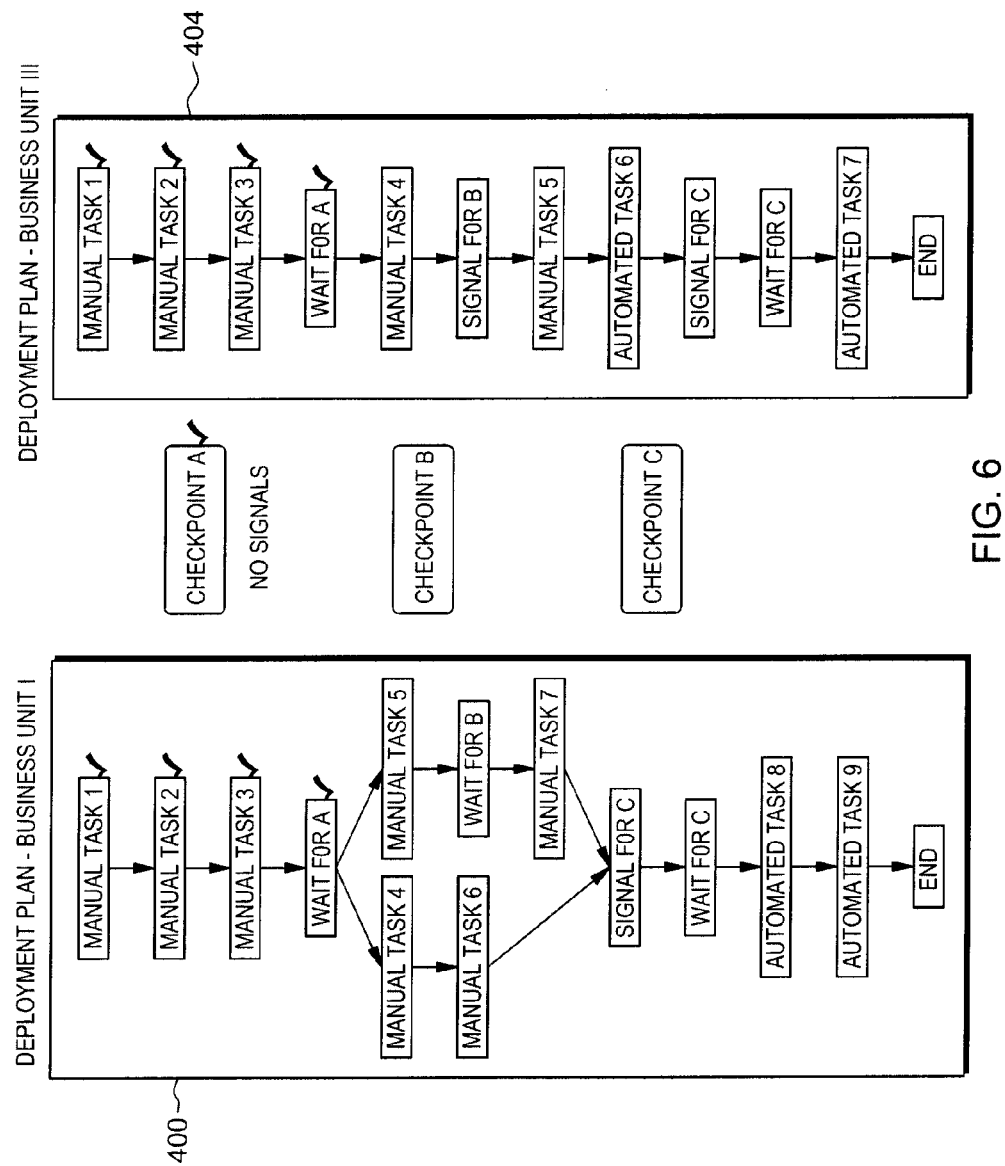
FIG. 6 depicts completion statuses of tasks during concurrent execution of a second deployment event including a second collection of the multiple deployment plans, in accordance with aspects described herein.

Depicted in FIG. 6 is a second and different collection of the multiple deployment plans, forming a second and different deployment event. In the example of FIG. 6, the deployment event includes only plans 400 and 404 of the multiple deployment plans (400, 402, 404) in which the waits and signals were defined. So, the scope of the deployment event in the example of FIG. 6 is different from the scope of the deployment event in the example of FIG. 5. FIG. 6 depicts completion statuses of tasks during the concurrent execution of a second deployment event including a second collection of the multiple deployment plans, in accordance with aspects described herein. Specifically, the completion status up through the wait tasks for checkpoint A is depicted. In this deployment event, no involved deployment plan signals checkpoint A but both involved plans 400 and 404 wait on satisfaction of checkpoint A (i.e. after manual task 3 in plan 400 and after manual task 3 in plan 404). Thus, in this example, there are no signals for checkpoint A so it may be regarded as automatically satisfied. Because this approach uses intermediary checkpoints as between the dependent tasks, there is no re-configuration of the participating deployment plans. Without changing any involved plan (i.e. plan 400 or 404), the absence of a signal for checkpoint A and the resulting automatic satisfaction of that checkpoint means that the corresponding wait tasks in plans 400 and 404 pass automatically when started. It is not necessary to, for instance, modify the involved plans to remove the wait tasks for checkpoint A, which enables reusability of the plans absent modification to set proper dependencies. As described above, a grouping mechanism can scope the impact of the checkpoints and how they become satisfied given which deployment plans participate in a given deployment event, so that no special configuration is needed to ensure dependency compliance and tracking for the given deployment event. This ensures that, for instance, checkpoints of the given deployment event are not waiting on signals from different deployment events.

Because the release automation program or other managing entity managing execution of a deployment event know the completion status for checkpoints as well as which plans are waiting on checkpoint completion, the managing entity can determine timing updates for estimated start times of tasks of the participating plans. A plan may be automatically updated to show the latest timing information for its tasks based on the status of the other plans that impact it. Accordingly, if the plan for one business unit is running late, another business unit may be affected by that delay, and the another business unit can be provided an indication of the delay and timing updates. This allows the managing entity to automatically account for dependencies between plans and provide timing updates, which provides a level of communication between the business units.

Thus, within the domain of development operations and deployment/release automation:

Cross-plan dependencies may be applied to the concept of deployment plans in both automation and/or manual deployment orchestration (for instance application release automation);

Awareness of parallel deployments may be provided to enforce proper execution;

Adjustments to timing estimations may be provided based on the state of execution in parallel deployments; and Enterprise deployment events may group parallel deployments.

With respect to plan/project execution, methodology, and management, facilities described herein provide application of a publish-subscribe pattern and checkpoint logic to task management, providing flexibility and reusability. Additionally provided is deployment plan execution dependent on other plan(s), and accommodating any cardinality (1:1, 1:N, N:M) absent a need to customize configurations of the plans across different deployment events. Furthermore, dependencies among plans do not require knowledge of other plans due to the loose coupling provided by the intermediary contracts (checkpoints).

Figure 7A:
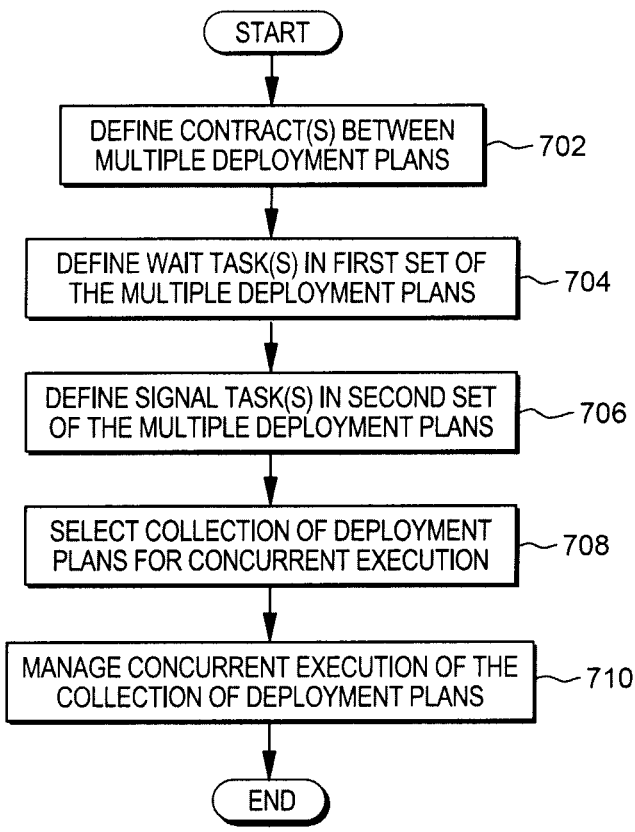
FIGS. 7A-7C depict examples processes for deployment plan execution, in accordance with aspects described herein.
Figure 7B:
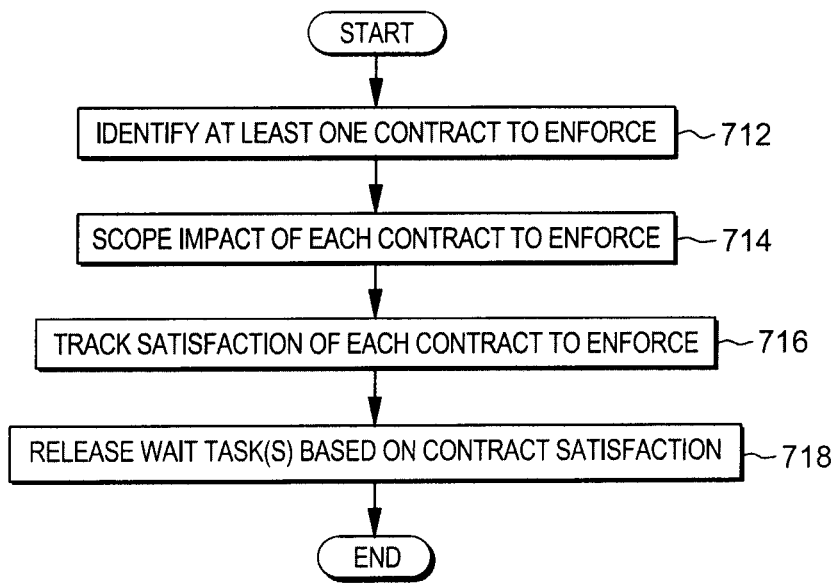
Figure 7C:
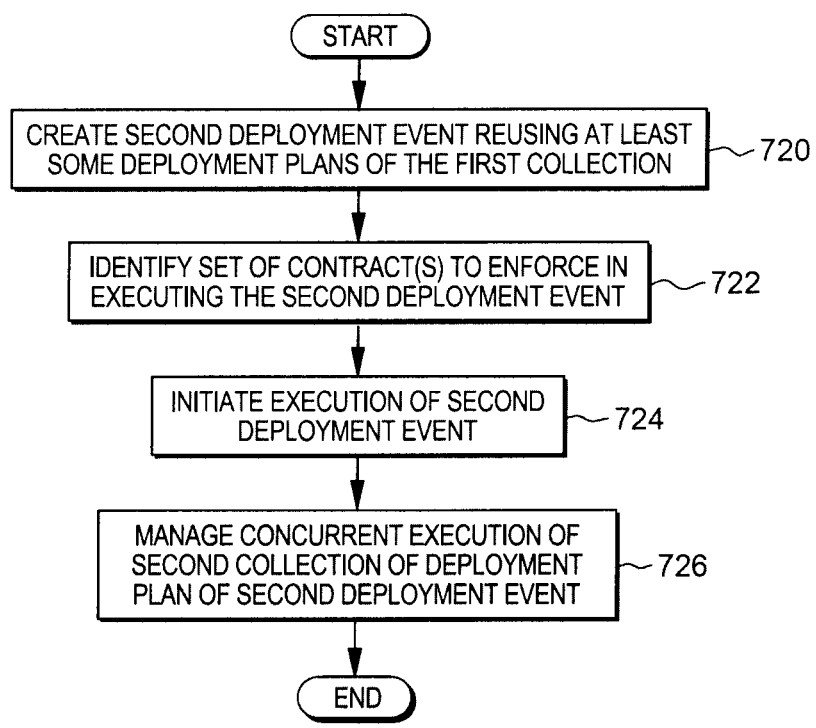

FIGS. 7A-7C depict examples processes for deployment plan execution, in accordance with aspects described herein. In some examples, aspects of the processes of FIGS. 7A-7C are performed by one or more computer system(s), such as one or more managing servers.

The process of FIG. 7A begins by defining one or more contracts as between multiple deployment plans (702). The one or more contracts represent one or more dependencies between the multiple deployment plans. In some examples, contract definition is based on input from a user who defines dependencies between tasks of different deployment plans.

The process continues by defining one or more wait tasks in a first set of the multiple deployment plans (704). Different wait task(s) may be defined in the one or more deployment plans that are part of the first set of the multiple deployment plans. The first set can include one, many, or all of the multiple deployment plans. Each wait task of the one or more wait tasks may be associated with a respective contract of the one or more defined contracts, where completion of the wait task and progression of a deployment plan in which the wait task is defined may be dependent on satisfaction of the contract. In this manner, the wait task may indicate a point at which progression of the deployment plan is to wait until one or more items that the plan is dependent upon are completed.

The process of FIG. 7A then includes defining one or more signal tasks in a second set of the multiple deployment plans (706). The second set of the deployment plans may include one or more same and/or different deployment plans than those included in the first set of deployment plans in which the wait task(s) are defined. Thus, the second set of the multiple deployment plans (i) includes the same deployment plans as the first set of the multiple deployment plans, (iii) includes a deployment plan not included in the first set of the multiple deployment plans, and/or (ii) does not include a deployment included in the first set of the multiple deployment plans.

Satisfaction of the contract may be based on status of at least one of the defined signal task(s). If the signal task for a checkpoint is part of a collection of deployment plans to concurrently execute, then status of the signal task refers to whether or not the signal task has run to deliver the requisite signal to the checkpoint. Satisfaction of the checkpoint in that example is based at least in part on the running of that signal task. Alternatively, if a signal task is defined for a checkpoint but is not part of a deployment plan included in the collection of deployment plans to concurrently execute, then status of the signal task refers to non-participation of that signal task in terms of satisfying the contract, and the contract is deemed automatically satisfied at least with respect to that signal task. If there are no signals for a checkpoint included in any deployment plan participating in a particular deployment event, then the checkpoint is deemed automatically satisfied by virtue of the fact that the status of all signals for the checkpoint are non-participating. In the example of FIG. 6, the only signal task that is defined to satisfy checkpoint A (see FIG. 4) is in a plan that is not involved in the deployment event. That signal task's status as non-involved informs the system that checkpoint A can be automatically regarded as satisfied because there are no participating signals to signal that checkpoint.

The process of FIG. 7A continues by selecting a collection of deployment plans, of the multiple deployment plans, for concurrent execution (708) as part of a deployment event. There may be dependencies as between plans of the collection of deployment plans, in which case contract(s) of the one or more contracts represents these dependencies, of the one or more dependencies, between the collection of deployment plans.

The process of FIG. 7A then proceeds to manage the concurrent execution of the collection of deployment plans (710). The managing controls progression of the execution of the collection of deployment plans by enforcing the at least one contract, which enforces the at least one dependency between the collection of deployment plans in the execution of the collection of deployment plans.

In some examples, the process of FIG. 7A includes creating a deployment event automatically and/or via input from a user, the deployment event including the collection of deployment plans. The collection of deployment plans can include one or more deployment plans of the multiple deployment plans, and the collection of deployment plans may be parallel deployments. Each deployment plan of the collection of deployment plans can correspond to a deployment of a respective different business unit of a collection of business units of an enterprise, where the execution of the collection of deployment plans may be performed as part of an enterprise application release automation process, for instance. After a deployment event is created, a managing system, as one example, can identify the at least one contract to enforce, based on which one or more deployment plans of the multiple deployment plans are included in the collection of deployment plans of the deployment event and based on signal tasks and wait tasks included in the collection of deployment plans of the deployment event. Thus, depending on which deployment plans are involved, different checkpoints and signals may be relevant. If no deployment plan of the deployment event waits on a particular checkpoint, that checkpoint may be scoped-out of consideration when the deployment event runs. Thereafter, execution of the deployment event may be initiated, for instance manually or automatically, by a trigger. Then, execution of the deployment event can include the concurrent execution of the collection of deployment plans.

The one or more wait tasks, one or more signal tasks, and one or more contracts may be implemented as a publish/subscribe pattern where the one or more wait tasks are subscribers to the one or more contracts (checkpoints), the one or more signal tasks are publishers to the one or more contracts, and the one or more contracts are topics to which the wait tasks subscribe and signal tasks publish. The managing can broker indications of contract subscription and satisfaction for the one or more wait tasks and the one or more signal tasks.

FIG. 7B depicts an example process of managing execution of a collection of deployment plans, in accordance with aspects described herein. This process may be performed by one or more computer systems, such as a managing entity like a release automation program.

The process identifies the at least one contract to enforce (712) and scopes the impact of each contract to enforce (714). Identifying the at least one contract can be based on which one or more deployment plans of the multiple deployment plans are included in the collection of deployment plans and on signal tasks and wait tasks included in the collection of deployment plans. This scoping an impact of each contract of the at least contract to be enforced can include, for each contract of the at least one contract: identifying a respective set of signal tasks (if any), included in the collection of deployment plans, that are to complete in order to satisfy the contract, and identifying a respective set of wait tasks, included in the collection of deployment plans, that are dependent on satisfaction of the contract. The process then tracks satisfaction of each contract of the at least one contract during the concurrent execution and based on completion of the respective set of signal tasks that are to complete to satisfy the contract (716). In a particular example, the respective set of signal tasks can include zero signal tasks, indicating that there are no signal tasks included in the collection of deployment plans that are to complete in order to satisfy the contract (see FIG. 5 checkpoint A). In this case, the contract is considered automatically satisfied for the execution of the collection of deployment plans.

For each contract of the at least one contract, and based on satisfaction of the contract, the respective wait tasks that are dependent on satisfaction of the contract are released (718) and execution flow of each deployment plan waiting on the checkpoint can proceed.

The managing can further include providing updated anticipated task completion timing to a deployment plan, of the collection of deployment plans, having one or more dependencies on another deployment plan of the collection of deployment plans, based on progress of execution of the another deployment plan.

FIG. 7C depicts further aspects of an example process for deployment plan execution, involving a different deployment event. The initial deployment event (FIG. 7A #708) may be a first deployment event, with the collection of deployment plans of the first deployment event being a first collection of deployment plans. FIG. 7C provides additional aspects, including creating a second deployment event including a second collection of deployment plans of the multiple deployment plans, where the creating reuses, as-is, at least some deployment plans of the first collection of deployment plans in the second collection of deployment plans of the second deployment event (720). The process continues by identifying a set of one or more contracts, of the defined one or more contracts, to enforce in executing the second deployment event (722) based on which one or more deployment plans of the multiple deployment plans are included in the second collection of deployment plans of the second deployment event and based on signal tasks and wait tasks included in the second collection of deployment plans of the second deployment event. Then the process initiates execution of the second deployment event (724), which initiates concurrent execution of the second collection of deployment plans. The process then manages the concurrent execution of the second collection of deployment plans of the second deployment event (726). Management of the concurrent execution of the second collection of deployment plans is similar to the management of the execution of the first collection of deployment plans in that the managing controls progression of the execution of the second collection of deployment plans by enforcing the set of one or more contracts, which enforces dependencies between the second collection of deployment plans in the execution of the second collection of deployment plans.

The second collection of deployment plans of the second deployment event could be the exact same deployment plans as those of the first deployment event. Alternatively, the second collection of deployment plans of the second deployment event could (i) include at least one deployment plan, of the multiple deployment plans, not included in the first collection of deployment plans of the first deployment event or (ii) omit at least one deployment plan that is included in the first collection of deployment plans of the first deployment event.

Processes described herein may be performed singly or collectively by one or more computer systems, such as computer system(s) described below with reference to FIG. 8. In some embodiments, such a computer system may be or include a managing server, such as a server running a release automation program.

Figure 8:
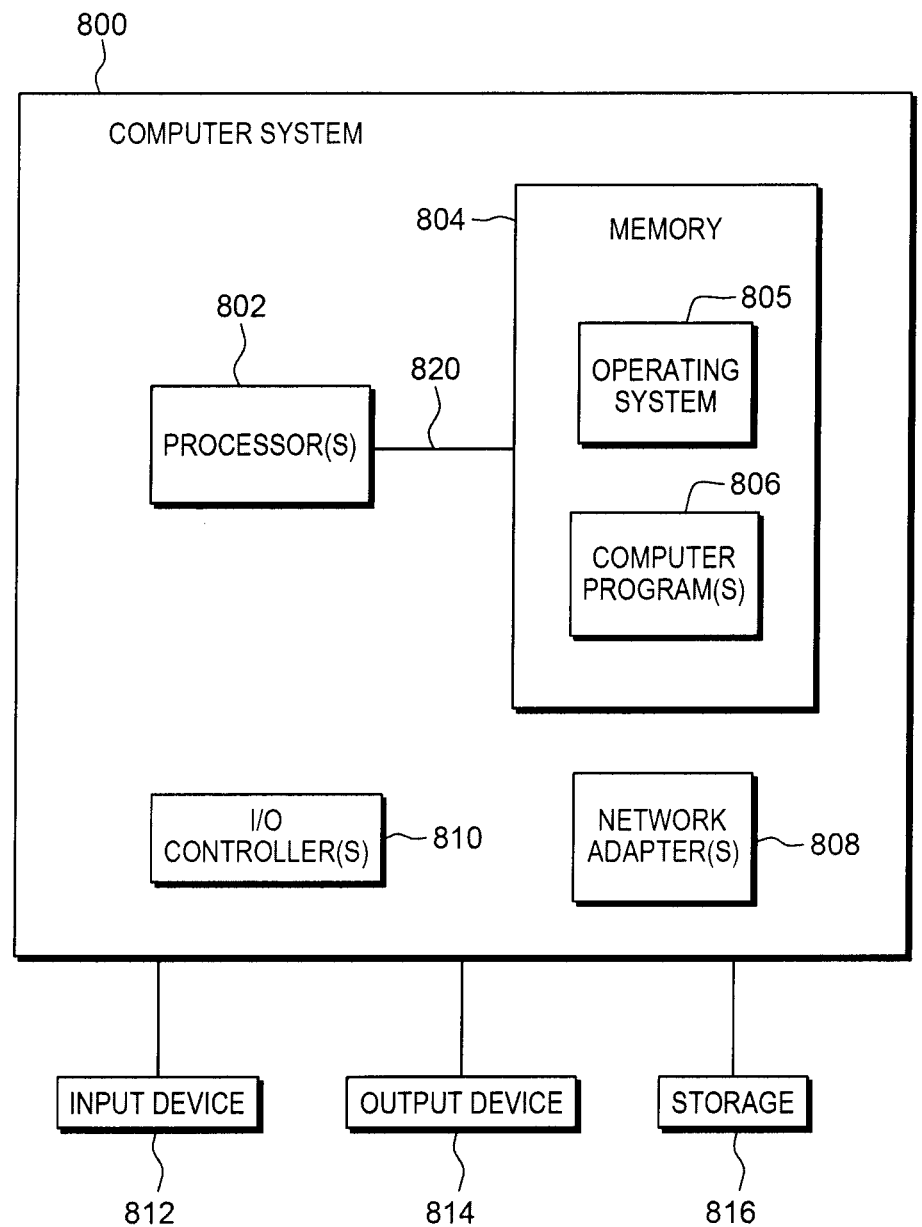
FIG. 8 depicts an example of a computer system to incorporate or use aspects described herein.

FIG. 8 depicts one example of a computer system to incorporate or use aspects described herein. A computer system may also be referred to herein as a data processing device/system or computing device/system, or simply a computer. Computer system 800 may be based on one or more of various system architectures such as those offered by International Business Machines Corporation (Armonk, N.Y., USA) or Intel Corporation (Santa Clara, Calif., USA), as examples.

Computer system 800 is suitable for storing and/or executing program code and includes at least one processor 802 coupled directly or indirectly to memory 804 through, e.g., a system bus 820. In operation, processor(s) 802 obtain from memory 804 one or more instructions for execution by the processors. Memory 804 may include local memory employed during actual execution of the program code, bulk storage, and cache memories which provide temporary storage of at least some program code in order to reduce the number of times code must be retrieved from bulk storage during program code execution. A non-limiting list of examples of memory 804 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 804 includes an operating system 805 and one or more computer programs 806, for instance a release automation program and/or other programs to perform aspects described herein.

Input/Output (I/O) devices 812, 814 (including but not limited to displays, microphones, speakers) may be coupled to the system either directly or through I/O controllers 810.

Network adapter(s) 808 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 808 used in computer systems.

Computer system 800 may be coupled to storage 816 (e.g., a non-volatile storage area, such as magnetic disk drives, optical disk drives, a tape drive, etc.), having one or more databases. Storage 816 may include an internal storage device or an attached or network accessible storage. Computer programs in storage 816 may be loaded into memory 804 and executed by a processor 802 in a manner known in the art.

The computer system 800 may include fewer components than illustrated, additional components not illustrated herein, or some combination of the components illustrated and additional components. Computer system 800 may include any computing device known in the art, such as a mainframe, server, personal computer, workstation, laptop, handheld or mobile computer, tablet, wearable device, telephony device, network appliance (such as an edge appliance), virtualization device, storage controller, etc.

Figure 9:
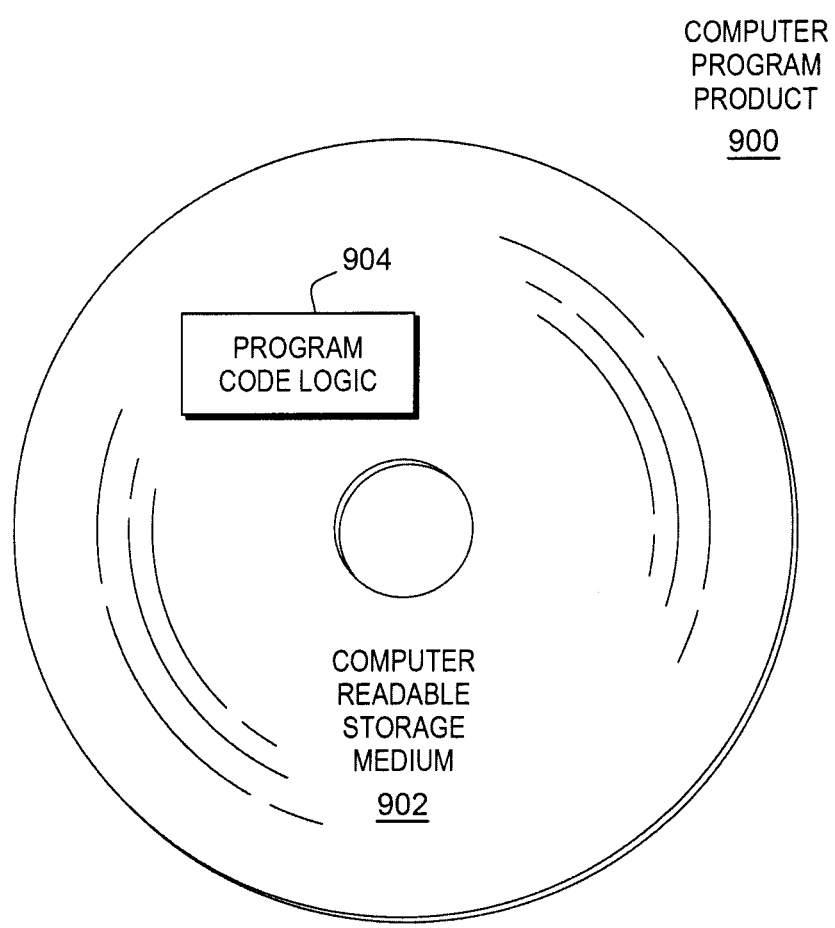
FIG. 9 depicts one embodiment of a computer program product.

Referring to FIG. 9, in one example, a computer program product 900 includes, for instance, one or more computer readable storage media 902 to store computer readable program code means, logic and/or instructions 904 thereon to provide and facilitate one or more embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   defining one or more contracts as between multiple deployment plans, the one or more contracts representing one or more dependencies between the multiple deployment plans;
   defining one or more wait tasks in a first set of the multiple deployment plans, wherein each wait task of the one or more wait tasks subscribes to a respective contract of the one or more contracts;
   defining one or more signal tasks in a second set of the multiple deployment plans, wherein each signal task of the one or more signal tasks publishes to a respective contract of the one or more contracts;
   selecting a collection of deployment plans of the multiple deployment plans for concurrent execution, the collection of deployment plans having computer-executable tasks effecting an application release automation process in which software application code is deployed and put into production on one or more computer systems, wherein at least one contract of the one or more contracts represents at least one dependency, of the one or more dependencies, between the collection of deployment plans; and
   managing the concurrent execution of the collection of deployment plans, the managing controlling progression of the execution of the collection of deployment plans by enforcing the at least one contract, the enforcing the at least one contract enforcing the at least one dependency between the collection of deployment plans in the execution of the collection of deployment plans, the managing comprising:
   a managing computer system identifying, based on which of the multiple deployment plans are part of the collection of deployment plans, a collection of signal tasks as the signal tasks that are included in the collection of deployment plans and publish to any contract of the at least one contract, wherein a signal task, of the one or more signal tasks, that is not included in the collection of deployment plans and therefore not included in the collection of signal tasks also publishes to a contract of the at least one contract;
   the managing computer system receiving signals from the signal tasks of the collection of signal tasks that publish to any contract of the at least one contract, and querying to check whether all signals that are tied to a contract and are in any deployment plan of the collection of deployment plans are completed; and
   the managing computer system coordinating release of wait tasks that are included in the collection of deployment plans and subscribe to any contract of the at least one contract, wherein the managing computer system coordinates release of the wait tasks despite nonparticipation of the signal task that is not included in the collection of signal tasks in publishing to the contract as part of the concurrent execution of the collection of deployment plans.

2. The method of claim 1, wherein the managing further comprises:
   identifying the at least one contract to enforce, the identifying being based on which one or more deployment plans of the multiple deployment plans are included in the collection of deployment plans and on signal tasks and wait tasks included in the collection of deployment plans;
   scoping an impact of each contract of the at least contract to be enforced, the scoping comprising, for each contract of the at least one contract:
      identifying a respective set of signal tasks, included in the collection of deployment plans, that are to complete in order to satisfy the contract; and
      identifying a respective set of wait tasks, included in the collection of deployment plans, that are dependent on satisfaction of the contract;
   tracking satisfaction of each contract of the at least one contract based on completion of the respective set of signal tasks that are to complete to satisfy the contract; and
   for each contract of the at least one contract, releasing, based on satisfaction of the contract, the respective set of wait tasks that are dependent on satisfaction of the contract.

3. The method of claim 2, wherein the respective set of signal tasks comprises zero signal tasks, indicating that there are no signal tasks included in the collection of deployment plans that are to complete in order to satisfy the contract, wherein the contract is considered automatically satisfied for the execution of the collection of deployment plans.

4. The method of claim 1, further comprising:
   creating a deployment event, the deployment event including the collection of deployment plans, the collection of deployment plans comprising one or more deployment plans of the multiple deployment plans, and the collection of deployment plans being parallel deployments;
   identifying the at least one contract to enforce based on which one or more deployment plans of the multiple deployment plans are included in the collection of deployment plans of the deployment event and based on signal tasks and wait tasks included in the collection of deployment plans of the deployment event; and
   initiating execution of the deployment event, the execution of the deployment event comprising the concurrent execution of the collection of deployment plans.

5. The method of claim 4, wherein the deployment event is a first deployment event and the collection of deployment plans is a first collection of deployment plans, and wherein the method further comprises:
   creating a second deployment event including a second collection of deployment plans of the multiple deployment plans, the creating comprising reusing, as-is, at least some deployment plans of the first collection of deployment plans in the second collection of deployment plans of the second deployment event;
identifying a set of one or more contracts, of the defined one or more contracts, to enforce in executing the second deployment event based on which one or more deployment plans of the multiple deployment plans are included in the second collection of deployment plans of the second deployment event and based on signal tasks and wait tasks included in the second collection of deployment plans of the second deployment event;
initiating execution of the second deployment event, the execution of the second deployment event comprising concurrent execution of the second collection of deployment plans; and
managing the concurrent execution of the second collection of deployment plans, comprising controlling progression of the execution of the second collection of deployment plans by enforcing the set of one or more contracts, the enforcing the set of one or more contracts enforcing dependencies between the second collection of deployment plans in the execution of the second collection of deployment plans.

6. The method of claim 5, wherein the second collection of deployment plans of the second deployment event (i) includes at least one deployment plan, of the multiple deployment plans, not included in the first collection of deployment plans of the first deployment event or (ii) omits at least one deployment plan that is included in the first collection of deployment plans of the first deployment event.

7. The method of claim 1, wherein the managing brokers indications of contract subscription and satisfaction for the one or more wait tasks and the one or more signal tasks.

8. The method of claim 1, wherein the managing further comprises providing updated anticipated task completion timing to a deployment plan, of the collection of deployment plans, having one or more dependencies on another deployment plan of the collection of deployment plans, based on progress of execution of the another deployment plan.

9. The method of claim 1, wherein the first set of the multiple deployment plans includes the same deployment plans as the second set of the multiple deployment plans, includes a deployment plan not included in the second set of the multiple deployment plans, or does not include a deployment plan included in the second set of the multiple deployment plans.

10. The method of claim 1, wherein each deployment plan of the collection of deployment plans corresponds to a deployment of a respective different business unit of a collection of business units of an enterprise, and wherein the execution of the collection of deployment plans is performed as part of an enterprise application release automation process.

11. A computer program product comprising:
a computer readable storage medium readable by a processing circuit and storing instructions for execution by the processing circuit for performing a method comprising:
defining one or more contracts as between multiple deployment plans, the one or more contracts representing one or more dependencies between the multiple deployment plans;
defining one or more wait tasks in a first set of the multiple deployment plans, wherein each wait task of the one or more wait tasks subscribes to a respective contract of the one or more contracts;
defining one or more signal tasks in a second set of the multiple deployment plans, wherein each signal task of the one or more signal tasks publishes to a respective contract of the one or more contracts;
selecting a collection of deployment plans of the multiple deployment plans for concurrent execution, the collection of deployment plans having computer-executable tasks effecting an application release automation process in which software application code is deployed and put into production on one or more computer systems, wherein at least one contract of the one or more contracts represents at least one dependency, of the one or more dependencies, between the collection of deployment plans; and
managing the concurrent execution of the collection of deployment plans, the managing controlling progression of the execution of the collection of deployment plans by enforcing the at least one contract, the enforcing the at least one contract enforcing the at least one dependency between the collection of deployment plans in the execution of the collection of deployment plans, the managing comprising:
a managing computer system identifying, based on which of the multiple deployment plans are part of the collection of deployment plans, a collection of signal tasks as the signal tasks that are included in the collection of deployment plans and publish to any contract of the at least one contract, wherein a signal task, of the one or more signal tasks, that is not included in the collection of deployment plans and therefore not included in the collection of signal tasks also publishes to a contract of the at least one contract;
the managing computer system receiving signals from the signal tasks of the collection of signal tasks that publish to any contract of the at least one contract, and querying to check whether all signals that are tied to a contract and are in any deployment plan of the collection of deployment plans are completed; and
the managing computer system coordinating release of wait tasks that are included in the collection of deployment plans and subscribe to any contract of the at least one contract, wherein the managing computer system coordinates release of the wait tasks despite nonparticipation of the signal task that is not included in the collection of signal tasks in publishing to the contract as part of the concurrent execution of the collection of deployment plans.

12. The computer program product of claim 11, wherein the managing further comprises:
identifying the at least one contract to enforce, the identifying being based on which one or more deployment plans of the multiple deployment plans are included in the collection of deployment plans and on signal tasks and wait tasks included in the collection of deployment plans;
scoping an impact of each contract of the at least contract to be enforced, the scoping comprising, for each contract of the at least one contract:
identifying a respective set of signal tasks, included in the collection of deployment plans, that are to complete in order to satisfy the contract; and
identifying a respective set of wait tasks, included in the collection of deployment plans, that are dependent on satisfaction of the contract;

tracking satisfaction of each contract of the at least one contract based on completion of the respective set of signal tasks that are to complete to satisfy the contract; and for each contract of the at least one contract, releasing, based on satisfaction of the contract, the respective set of wait tasks that are dependent on satisfaction of the contract.

13. The computer program product of claim 11, wherein the method further comprises:

creating a deployment event, the deployment event including the collection of deployment plans, the collection of deployment plans comprising one or more deployment plans of the multiple deployment plans, and the collection of deployment plans being parallel deployments;

identifying the at least one contract to enforce based on which one or more deployment plans of the multiple deployment plans are included in the collection of deployment plans of the deployment event and based on signal tasks and wait tasks included in the collection of deployment plans of the deployment event; and initiating execution of the deployment event, the execution of the deployment event comprising the concurrent execution of the collection of deployment plans.

14. The computer program product of claim 13, wherein the deployment event is a first deployment event and the collection of deployment plans is a first collection of deployment plans, and wherein the method further comprises:

creating a second deployment event including a second collection of deployment plans of the multiple deployment plans, the creating comprising reusing, as-is, at least some deployment plans of the first collection of deployment plans in the second collection of deployment plans of the second deployment event;

identifying a set of one or more contracts, of the defined one or more contracts, to enforce in executing the second deployment event based on which one or more deployment plans of the multiple deployment plans are included in the second collection of deployment plans of the second deployment event and based on signal tasks and wait tasks included in the second collection of deployment plans of the second deployment event;

initiating execution of the second deployment event, the execution of the second deployment event comprising concurrent execution of the second collection of deployment plans; and managing the concurrent execution of the second collection of deployment plans, comprising controlling progression of the execution of the second collection of deployment plans by enforcing the set of one or more contracts, the enforcing the set of one or more contracts enforcing dependencies between the second collection of deployment plans in the execution of the second collection of deployment plans.

15. The computer program product of claim 11, wherein the managing brokers indications of contract subscription and satisfaction for the one or more wait tasks and the one or more signal tasks.

16. A computer system comprising:
a memory; and
a processor in communication with the memory, wherein the computer system is configured to perform a method, the method comprising:

defining one or more contracts as between multiple deployment plans, the one or more contracts representing one or more dependencies between the multiple deployment plans;

defining one or more wait tasks in a first set of the multiple deployment plans, wherein each wait task of the one or more wait tasks subscribes to a respective contract of the one or more contracts;

defining one or more signal tasks in a second set of the multiple deployment plans, wherein each signal task of the one or more signal tasks publishes to a respective contract of the one or more contracts;

selecting a collection of deployment plans of the multiple deployment plans for concurrent execution, the collection of deployment plans having computer-executable tasks effecting an application release automation process in which software application code is deployed and put into production on one or more computer systems, wherein at least one contract of the one or more contracts represents at least one dependency, of the one or more dependencies, between the collection of deployment plans; and managing the concurrent execution of the collection of deployment plans, the managing controlling progression of the execution of the collection of deployment plans by enforcing the at least one contract, the enforcing the at least one contract enforcing the at least one dependency between the collection of deployment plans in the execution of the collection of deployment plans, the managing comprising:

a managing computer system identifying, based on which of the multiple deployment plans are part of the collection of deployment plans, a collection of signal tasks as the signal tasks that are included in the collection of deployment plans and publish to any contract of the at least one contract, wherein a signal task, of the one or more signal tasks, that is not included in the collection of deployment plans and therefore not included in the collection of signal tasks also publishes to a contract of the at least one contract, the managing computer system receiving signals from the signal tasks of the collection of signal tasks that publish to any contract of the at least one contract, and querying to check whether all signals that are tied to a contract and are in any deployment plan of the collection of deployment plans are completed; and the managing computer system coordinating release of wait tasks that are included in the collection of deployment plans and subscribe to any contract of the at least one contract, wherein the managing computer system coordinates release of the wait tasks despite nonparticipation of the signal task that is not included in the collection of signal tasks in publishing to the contract as part of the concurrent execution of the collection of deployment plans.

17. The computer system of claim 16, wherein the managing further comprises:

identifying the at least one contract to enforce, the identifying being based on which one or more deployment plans of the multiple deployment plans are included in the collection of deployment plans and on signal tasks and wait tasks included in the collection of deployment plans;

scoping an impact of each contract of the at least contract to be enforced, the scoping comprising, for each contract of the at least one contract:
    identifying a respective set of signal tasks, included in the collection of deployment plans, that are to complete in order to satisfy the contract; and
    identifying a respective set of wait tasks, included in the collection of deployment plans, that are dependent on satisfaction of the contract;
tracking satisfaction of each contract of the at least one contract based on completion of the respective set of signal tasks that are to complete to satisfy the contract; and
for each contract of the at least one contract, releasing, based on satisfaction of the contract, the respective set of wait tasks that are dependent on satisfaction of the contract.

18. The computer system of claim 16, wherein the method further comprises:
    creating a deployment event, the deployment event including the collection of deployment plans, the collection of deployment plans comprising one or more deployment plans of the multiple deployment plans, and the collection of deployment plans being parallel deployments;
    identifying the at least one contract to enforce based on which one or more deployment plans of the multiple deployment plans are included in the collection of deployment plans of the deployment event and based on signal tasks and wait tasks included in the collection of deployment plans of the deployment event; and
    initiating execution of the deployment event, the execution of the deployment event comprising the concurrent execution of the collection of deployment plans.

19. The computer system of claim 18, wherein the deployment event is a first deployment event and the collection of deployment plans is a first collection of deployment plans, and wherein the method further comprises:
    creating a second deployment event including a second collection of deployment plans of the multiple deployment plans, the creating comprising reusing, as-is, at least some deployment plans of the first collection of deployment plans in the second collection of deployment plans of the second deployment event;
    identifying a set of one or more contracts, of the defined one or more contracts, to enforce in executing the second deployment event based on which one or more deployment plans of the multiple deployment plans are included in the second collection of deployment plans of the second deployment event and based on signal tasks and wait tasks included in the second collection of deployment plans of the second deployment event;
    initiating execution of the second deployment event, the execution of the second deployment event comprising concurrent execution of the second collection of deployment plans; and
    managing the concurrent execution of the second collection of deployment plans, comprising controlling progression of the execution of the second collection of deployment plans by enforcing the set of one or more contracts, the enforcing the set of one or more contracts enforcing dependencies between the second collection of deployment plans in the execution of the second collection of deployment plans.

20. The computer system of claim 16, wherein the managing brokers indications of contract subscription and satisfaction for the one or more wait tasks and the one or more signal tasks.

* * * * *